(No Model.)
T. W. EVANS.
TREE PROTECTOR.
No. 469,552. Patented Feb. 23, 1892.
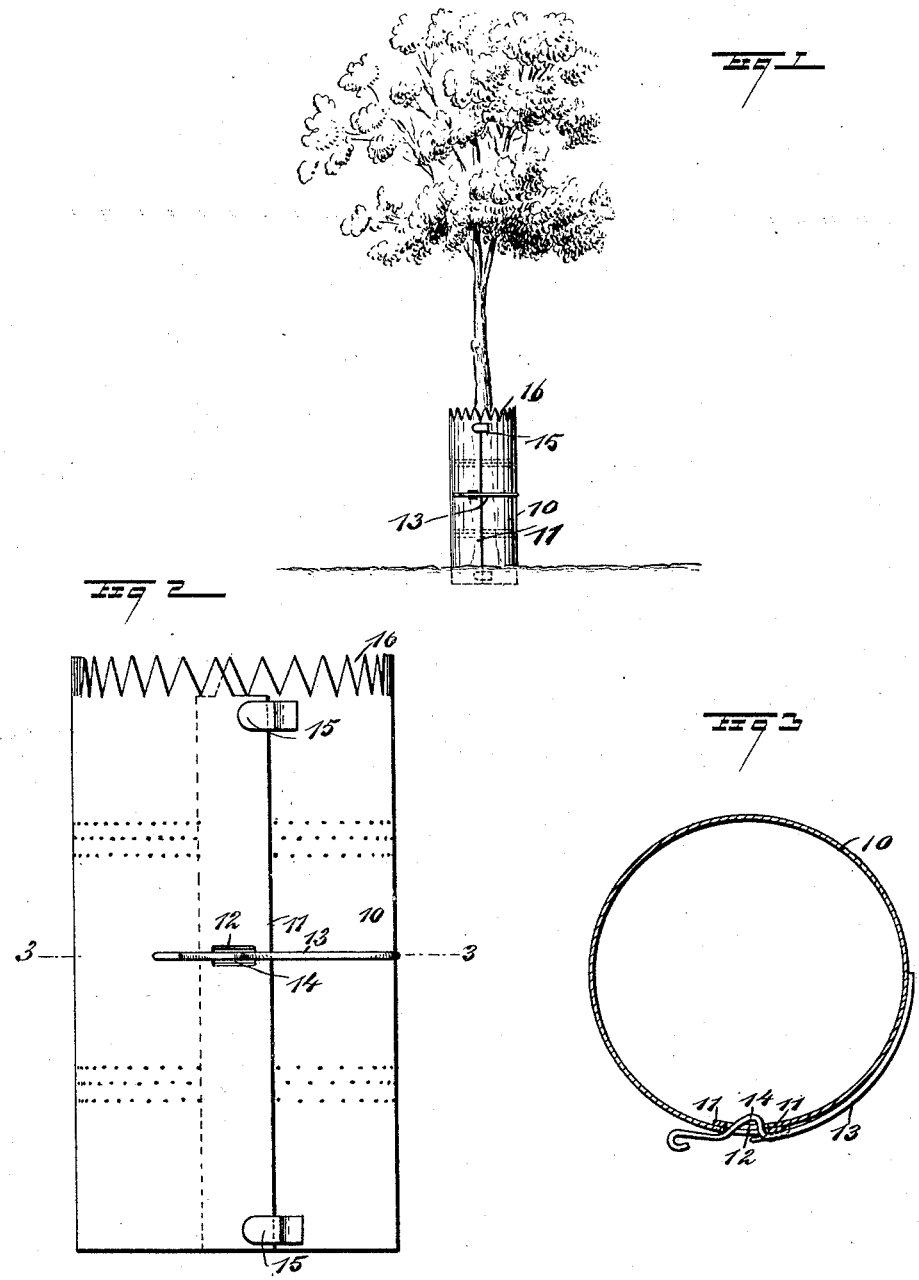

UNITED STATES PATENT OFFICE.

THOMAS W. EVANS, OF LECOMPTON, KANSAS.

TREE-PROTECTOR.

SPECIFICATION forming part of Letters Patent No. 469,552, dated February 23, 1892.

Application filed September 2, 1891. Serial No. 404,533. (No model.)

*To all whom it may concern:*

Be it known that I, THOMAS W. EVANS, of Lecompton, in the county of Douglas and State of Kansas, have invented a new and Improved Tree-Protector, of which the following is a full, clear, and exact description.

My invention relates to improvements in protectors for trees and shrubbery; and the object of my invention is to produce a simple and cheap device which may be quickly applied to a tree or shrub and which will effectively protect the same from attacks of rabbits, rats, mice, and other rodents, as well as from caterpillars, borers, and creeping insects of all kinds.

To this end my invention consists of a tree-protector, the construction of which will be hereinafter described and claimed.

Reference is to be had to the accompanying drawings, forming a part of this specification, in which similar figures of reference indicate corresponding parts in all the views.

Figure 1 is a side elevation of the protector as applied to a tree. Fig. 2 is an enlarged detail elevation of the protector, and Fig. 3 is a sectional plan view on the line 3 3 of Fig. 2.

The tree-protector 10 is preferably made of sheet metal, which is adapted to be rolled up into the form of a cylinder, as is best shown in Fig. 3, and the body of the protector has overlapping edges 11, in which are registering holes 12, and on the outer side of the protector is a spring-latch 13, having a bend 14 therein, which bend is adapted to project inward through the registering holes 12 and thus fasten the edges of the protector together.

The protector is provided on the outer side and near one edge with lugs 15, which are placed adjacent to the top and bottom of the protector, and these lugs are adapted to overlap the adjacent edge, as shown in Fig. 2, thus forming a tight joint, as the lugs and the central latch serve to bind all parts of the overlapping edges together.

The protector has teeth 16 formed upon its upper edge, which teeth terminate in sharp points and prevent any larger animals from getting at the tree or shrub. The protector is also provided near its upper and lower ends with a series of perforations, which admit air freely to it.

To apply the protector to a tree or shrub, it is simply wrapped around the object to be protected, the lugs 15 are made to overlap one edge of the protector, the latch 13 is adjusted so that the bend 14 will project through the registering holes 12, and the lower edge of the protector is forced downward into the ground. It will be seen that nothing can reach the tree, unless it passes over the top of the protector, and the smooth sides, together with the teeth upon its top, will prevent the ordinary destructive pests from doing this.

Having thus described my invention, I claim as new and desire to secure by Letters Patent—

1. A tree-protector comprising an apertured cylindrical body having overlapping edges provided with registering holes and stop-lugs near one edge and a spring-latch secured to the body and having a bend adapted to enter the registering apertures, substantially as described.

2. A tree-protector comprising a sheet-metal body having overlapping edges with registering holes therein, a spring-latch secured to the body and adapted to enter the holes, lugs secured to the body near one edge and adapted to overlap the adjacent edge, and a series of teeth upon the top edge of the body, substantially as shown and described.

THOMAS W. EVANS.

Witnesses:
W. H. CHRISTIAN,
J. E. WEITTS.